US009007636B2

(12) United States Patent
Tomono et al.

(10) Patent No.: US 9,007,636 B2
(45) Date of Patent: Apr. 14, 2015

(54) IMAGE FORMING APPARATUS, APPLICATION CONTROL METHOD, AND NON-TRANSITORY COMPUTER-READABLE RECORDING MEDIUM ENCODED WITH APPLICATION CONTROL PROGRAM

(71) Applicant: Konica Minolta, Inc., Chiyoda-ku (JP)

(72) Inventors: Kazuaki Tomono, Okazaki (JP); Kenji Matsuhara, Kawanishi (JP); Kenichi Takahashi, Sennan-gun (JP); Kazumi Sawayanagi, Itami (JP); Yosuke Taniguchi, Osaka (JP); Manabu Furukawa, Nagaokakyo (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 43 days.

(21) Appl. No.: 13/938,295

(22) Filed: Jul. 10, 2013

(65) Prior Publication Data

US 2014/0022589 A1 Jan. 23, 2014

(30) Foreign Application Priority Data

Jul. 18, 2012 (JP) ................................. 2012-159530

(51) Int. Cl.
*G06F 3/12* (2006.01)
*H04N 1/00* (2006.01)
(Continued)

(52) U.S. Cl.
CPC .......... *H04N 1/00962* (2013.01); *G06F 9/4843* (2013.01); *H04N 1/00938* (2013.01)

(58) Field of Classification Search
CPC ..... H04N 1/00938; G06F 3/12; G06F 3/1201; G06F 3/1279
See application file for complete search history.

(56) References Cited

U.S. PATENT DOCUMENTS 6,952,277 B1 10/2005 Ono
2005/0046887 A1 3/2005 Shibata et al.
(Continued)

FOREIGN PATENT DOCUMENTS

JP 09-293134 A 11/1997
JP 11-187190 A 7/1999
(Continued)

OTHER PUBLICATIONS

Office Action (Notice of Ground of Rejection) issued on Dec. 24, 2014, by the Japanese Patent Office in corresponding Japanese Patent Application No. 2012-159530, and an English Translation of the Office Action. (5 pages).

*Primary Examiner* — Dov Popovici
(74) *Attorney, Agent, or Firm* — Buchanan Ingersoll & Rooney PC

(57) ABSTRACT

An image forming apparatus includes an internal control portion to execute a process predetermined for an internal command, an application executing portion to execute an application program, and an application control portion to convert an application command output from the application executing portion into an internal command and output the internal command to the internal control portion. The application control portion includes a controlled-object determination portion to determine whether the hardware resource to be controlled by a first internal command obtained by converting a first application command input from a first custom portion and the hardware resource to be controlled by a second internal command obtained by converting a second application command input from a second custom portion are of the same type, and an arbitration portion to control timings for outputting the first and second internal commands on the basis of the determination result by the controlled-object determination portion.

12 Claims, 11 Drawing Sheets

(51) Int. Cl.
*G06F 9/48* (2006.01)
*G06K 15/00* (2006.01)

(56) References Cited

U.S. PATENT DOCUMENTS

2006/0164670 A1 7/2006 Morita
2007/0159663 A1 7/2007 Tsujimoto
2011/0292428 A1* 12/2011 Ishii .............................. 358/1.13

FOREIGN PATENT DOCUMENTS

| | | |
|---|---|---|
| JP | 2002-84383 A | 3/2002 |
| JP | 2004-135323 A | 4/2004 |
| JP | 2005-80017 A | 3/2005 |
| JP | 2005-80018 A | 3/2005 |
| JP | 2007-174400 A | 7/2007 |

* cited by examiner

F I G. 3
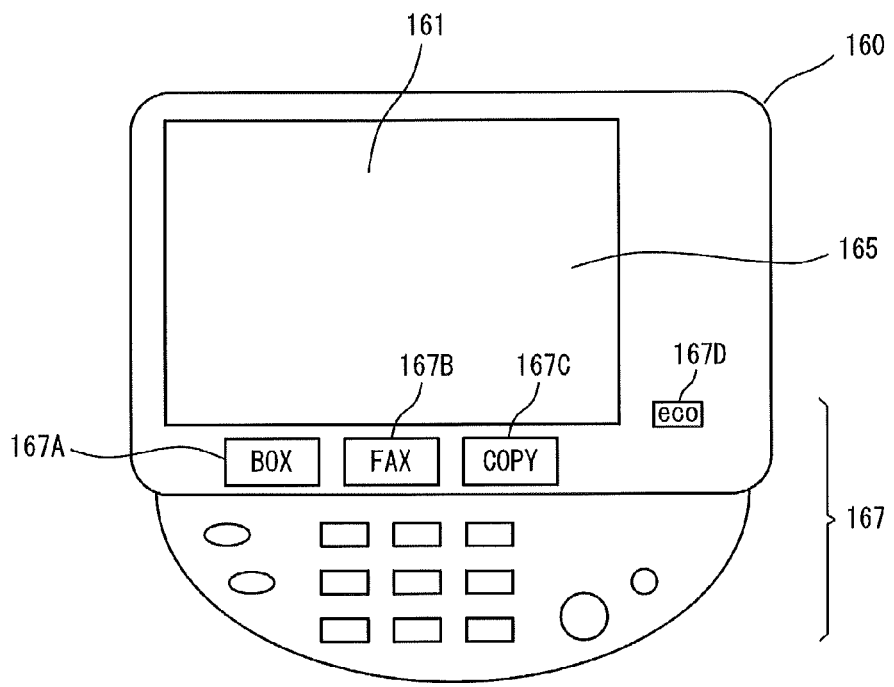

FIG. 7

| FUNCTION | HARDWARE RESOURCE NAME | NUMBER OF CONNECTIONS |
|---|---|---|
| DOCUMENT READING | DOCUMENT READING DEVICE | 2 |
| IMAGE FORMING | IMAGE FORMING DEVICE | 1 |
| FACSIMILE TRANSMISSION | FACSIMILE DEVICE | 2 |
| DATA COMMUNICATION | COMMUNICATION I/F PORTION | 1 |
| EXTERNAL DATA MANAGEMENT | EXTERNAL STORAGE DEVICE | 1 |
| DOCUMENT FEEDING | AUTOMATIC DOCUMENT FEEDER | 1 |
| PAPER FEEDING | PAPER FEEDING PORTION | 1 |
| USER INTERFACE | OPERATION PANEL | 1 |

# IMAGE FORMING APPARATUS, APPLICATION CONTROL METHOD, AND NON-TRANSITORY COMPUTER-READABLE RECORDING MEDIUM ENCODED WITH APPLICATION CONTROL PROGRAM

This application is based on Japanese Patent Application No. 2012-159530 filed with Japan Patent Office on Jul. 18, 2012, the entire content of which is hereby incorporated by reference.

BACKGROUND OF THE INVENTION

1. Field of the Invention

The present invention relates to an image forming apparatus, an application control method, and a non-transitory computer-readable recording medium encoded with an application control program. More particularly, the present invention relates to an image forming apparatus into which an application program can be installed, an application control method executed in the image forming apparatus, and a non-transitory computer-readable recording medium encoded with an application control program for causing a computer to execute the application control method.

2. Description of the Related Art

Some recent image forming apparatuses, typified by multi-function peripherals (MFPs), allow application programs to be installed therein. A user can customize an MFP by installing therein an application program according to the type of usage.

Japanese Patent Laid-Open No. 2002-084383 describes an image forming apparatus which brackets portions common to applications as a common system service, forms a platform using the common system service and a versatile OS, and installs a printer application, a copy application, and other various applications on the platform.

According to the conventional image forming apparatus, the portions common to applications are formed as a common system service on the platform. This means that, in the case where a new application program is developed, the platform itself may have to be changed.

SUMMARY OF THE INVENTION

An aspect of the present invention provides an image forming apparatus including a control portion to control hardware resources, wherein the control portion includes: an internal control portion operable, in response to an input of an internal command, to execute a process predetermined for the input internal command in order to control the hardware resources; an application executing portion to execute an application program; and an application control portion operable, in the case where the application executing portion outputs an application command which has been released for controlling the internal control portion, to convert the output application command into the internal command and output the obtained internal command to the internal control portion, the application executing portion including a first custom portion to execute a first application program, and a second custom portion to execute a second application program, the application control portion including a controlled-object determination portion operable, in the case where a first application command is input from the first custom portion and a second application command is input from the second custom portion, to determine whether the hardware resource to be controlled by a first internal command obtained by converting the first application command and the hardware resource to be controlled by a second internal command obtained by converting the second application command are of the same type, and an arbitration portion to control timings for outputting the first internal command and the second internal command to the internal control portion on the basis of the result of determination by the controlled-object determination portion.

Another aspect of the present invention provides an application control method performed by a computer controlling hardware resources included in an image forming apparatus, the computer including an internal control portion operable, in response to an input of an internal command, to execute a process predetermined for the input internal command in order to control the hardware resources, and an application executing portion to execute an application program, wherein the method causes the computer to execute: a conversion step of, in the case where the application executing portion outputs an application command which has been released for controlling the internal control portion, converting the output application command into the internal command; and an application control step of outputting the obtained internal command to the internal control portion, the application executing portion including a first custom portion to execute a first application program, and a second custom portion to execute a second application program, the application control step including a controlled-object determination step of, in the case where a first application command is input from the first custom portion and a second application command is input from the second custom portion, determining whether the hardware resource to be controlled by a first internal command obtained by converting the first application command and the hardware resource to be controlled by a second internal command obtained by converting the second application command are of the same type, and an arbitration step of controlling timings for outputting the first internal command and the second internal command to the internal control portion on the basis of the result of determination in the controlled-object determination step.

Yet another aspect of the present invention provides a non-transitory computer-readable recording medium encoded with an application control program performed by a computer controlling hardware resources included in an image forming apparatus, the computer including an internal control portion operable, in response to an input of an internal command, to execute a process predetermined for the input internal command in order to control the hardware resources, and an application executing portion to execute an application program, wherein the application control program causes the computer to execute: a conversion step of, in the case where the application executing portion outputs an application command which has been released for controlling the internal control portion, converting the output application command into the internal command; and an application control step of outputting the obtained internal command to the internal control portion, the application executing portion including a first custom portion to execute a first application program, and a second custom portion to execute a second application program, the application control step including a controlled-object determination step of, in the case where a first application command is input from the first custom portion and a second application command is input from the second custom portion, determining whether the hardware resource to be controlled by a first internal command obtained by converting the first application command and the hardware resource to be controlled by a second internal command obtained by converting the second application command are of the same type, and an arbitration step of controlling timings for outputting the first internal command and the second internal command to the internal control portion on the basis of the result of determination in the controlled-object determination step.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 3 is a plan view showing an example of an operation panel;

FIG. 7 shows an example of resource information;

DESCRIPTION OF THE PREFERRED EMBODIMENTS

Figure 1:
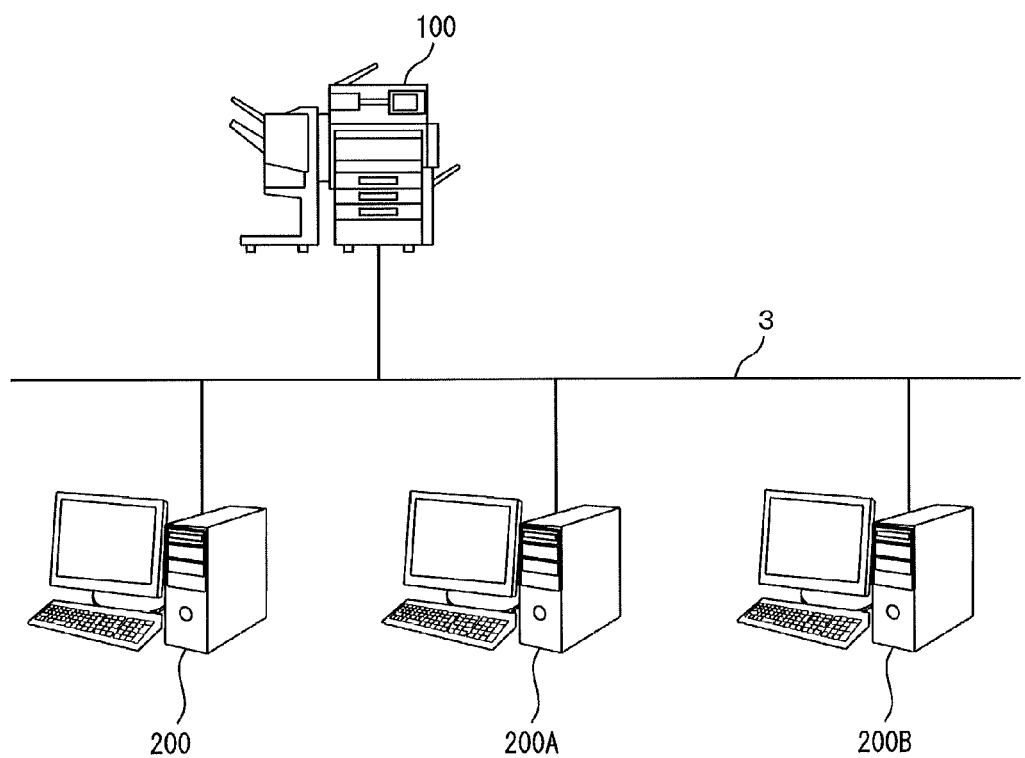
FIG. 1 schematically shows an image forming system according to an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

FIG. 1 schematically shows an image forming system according to an embodiment of the present invention. Referring to FIG. 1, an image forming system 1 includes a multi-function peripheral (hereinafter, referred to as "MFP") 100 and personal computers (hereinafter, referred to as "PCs") 200, 200A, and 200B, which are each connected to a network 3. MFP 100 and PCs 200, 200A, and 200B can communicate with each other via network 3.

While one MFP 100, as an example of an image forming apparatus, is connected to network 3 in FIG. 1, the number of the MFPs is not limited thereto; at least one MFP may be connected to network 3. Further, the image forming apparatus is not limited to the MFP; it may be, e.g., a computer, facsimile machine, printer, or other device, as long as it is provided with the image processing function.

Figure 2:
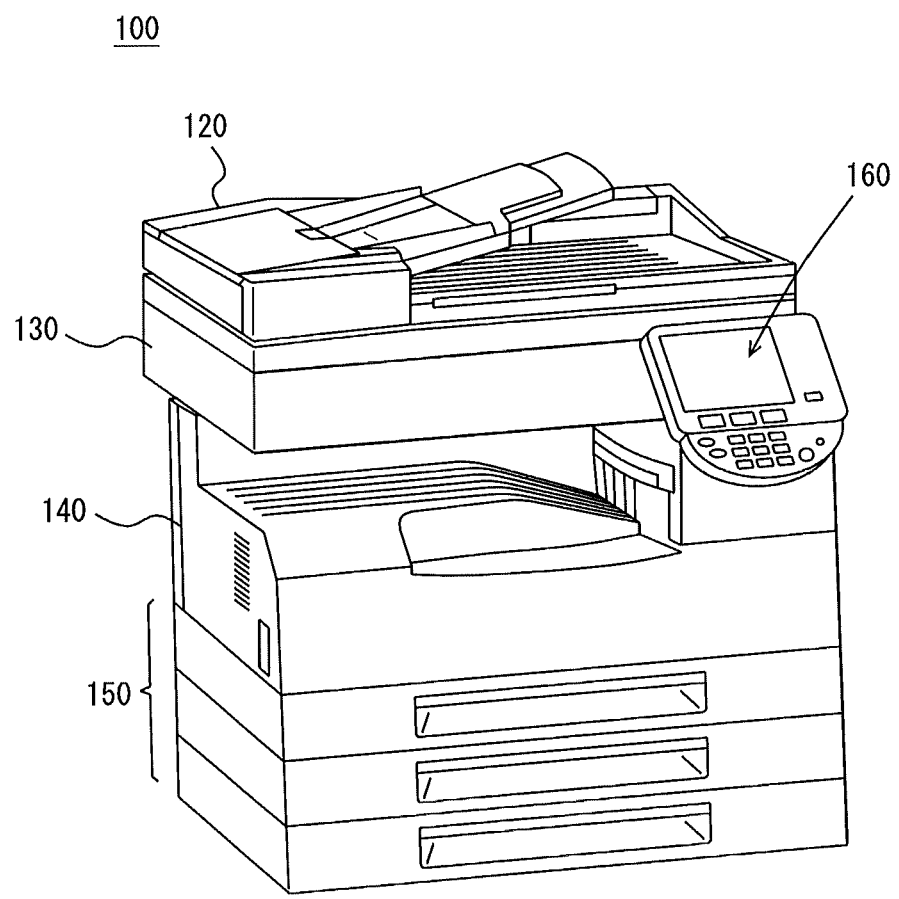
FIG. 2 is a perspective view of an MFP according to an embodiment of the present invention.
Figure 4:
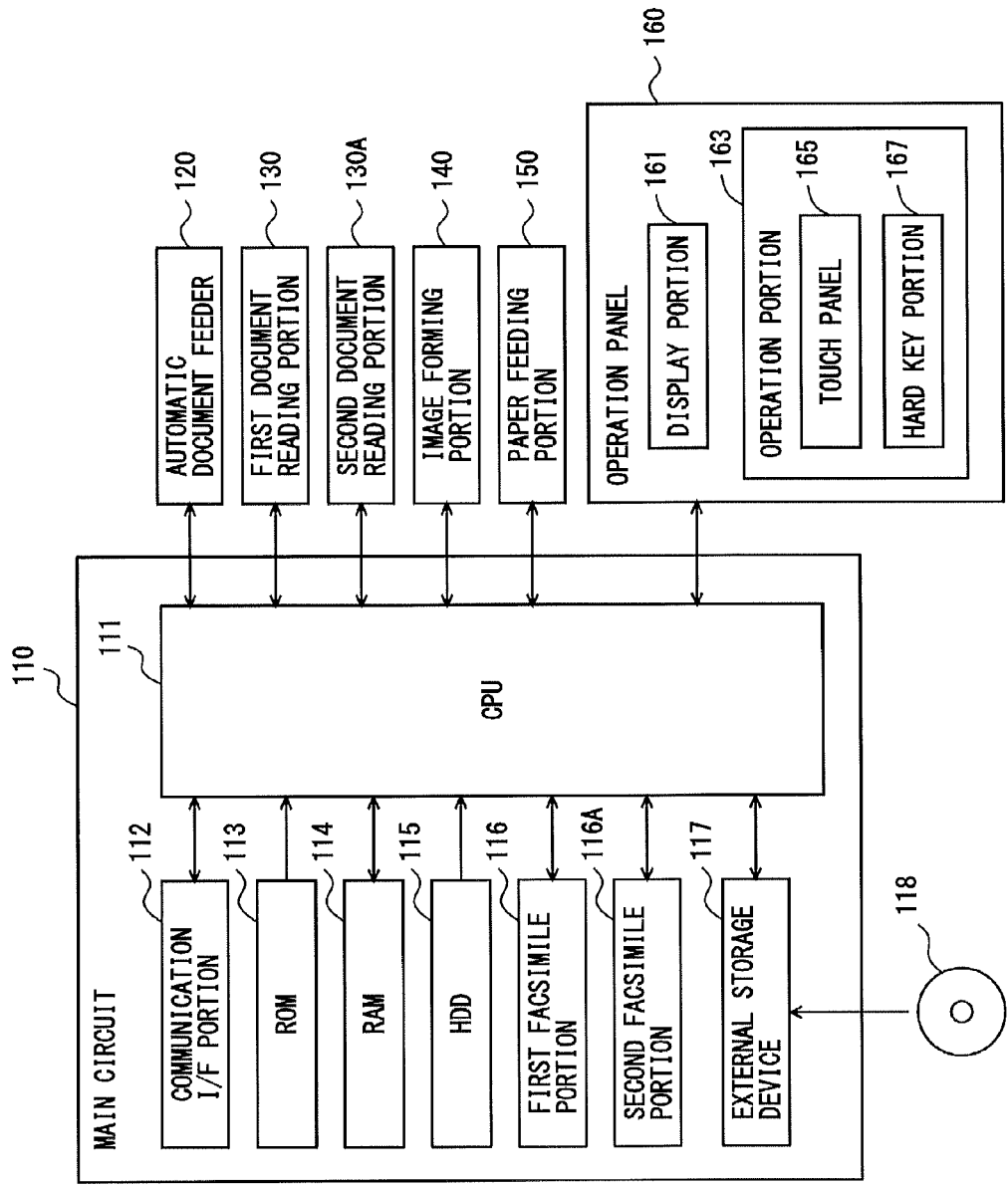
FIG. 4 is a block diagram schematically showing an example of the hardware configuration of the MFP.

FIG. 2 is a perspective view of an MFP according to an embodiment of the present invention. FIG. 3 is a plan view showing an example of an operation panel. Referring to FIG. 4, MFP 100 includes: a first document reading portion 130 and a second document reading portion 130A for reading a document; an automatic document feeder 120 for feeding a document to one of first and second document reading portions 130, 130A; an image forming portion 140 for forming an image on a sheet of paper or the like on the basis of image data which is output from one of first and second document reading portions 130, 130A that has read a document; a paper feeding portion 150 for feeding a sheet of paper to image forming portion 140; and an operation panel 160 serving as a user interface.

Operation panel 160 is arranged on an upper surface of MFP 100. Operation panel 160 includes: a display portion 161, a touch panel 165 which is made up of a transparent member and disposed on a surface of display portion 161, and a hard key portion 167. Display portion 161 is, for example, a liquid crystal display (LCD), and displays an instruction menu for a user, information about acquired image data, and so on. Hard key portion 167 is provided with a plurality of keys including four hard keys 167A to 167D having the characters "BOX", "FAX", "COPY", and "ECO" respectively displayed thereon, and accepts input data, such as instructions, characters, and numerical characters, according to the key operations by the user. Touch panel 165 detects a position on the display surface of display portion 161. Touch panel 165 is disposed on an upper or lower surface of display portion 161.

Automatic document feeder 120 automatically feeds a plurality of documents set on a document feed tray, one by one, to a predetermined document reading position set on a platen glass of one of first and second document reading portions 130, 130A, and outputs the document, the image of which has been read by the one of first and second document reading portions 130, 130A, onto a document output tray. Each of first and second document reading portions 130, 130A includes an optical source which irradiates a document placed on the document reading position with light and a photoelectric conversion element which receives light reflected from the document, and scans a document image having a size corresponding to that of the document. The photoelectric conversion element converts the received light into image data made up of electric signals, and outputs the image data to image forming portion 140. Paper feeding portion 150 feeds a sheet of paper, stored in a paper feed tray, to image forming portion 140.

Image forming portion 140 forms an image using well-known electrophotography. Image forming portion 140 performs various kinds of data processing, such as shading compensation, on image data received from one of first and second document reading portions 130, 130A, and, on the basis of the processed image data, or on the basis of externally received image data, forms an image on a sheet of paper fed by paper feeding portion 150.

FIG. 4 is a block diagram schematically showing an example of the hardware configuration of the MFP. Referring to FIG. 4, MFP 100 includes a main circuit 110. Main circuit 110 includes: a central processing unit (CPU) 111; a communication interface (I/F) portion 112; a read only memory (ROM) 113; a random access memory (RAM) 114; a hard disk drive (HDD) 115 as a mass storage; a first facsimile portion 116; a second facsimile portion 116A; and an external storage device 117. CPU 111 is connected with automatic document feeder 120, first and second document reading portions 130, 130A, image forming portion 140, paper feeding portion 150, and operation panel 160, and is responsible for overall control of MFP 100.

ROM 113 stores a program to be executed by CPU 111 or data necessary for execution of the program. RAM 114 is used as a work area when CPU 111 executes a program. Further, RAM 114 temporarily stores read images continuously transmitted from one of first and second document reading portions 130, 130A.

Each of first facsimile portion 116 and second facsimile portion 116A is connected to public switched telephone networks (PSTN), and transmits facsimile data to or receives facsimile data from the PSTN. Each of first facsimile portion 116 and second facsimile portion 116A stores the received facsimile data in HDD 115. Alternatively, each of first facsimile portion 116 and second facsimile portion 116A converts the data into print data which can be printed in image forming portion 140, and outputs the same to image forming portion 140, thereby causing image forming portion 140 to form an image on a sheet of paper on the basis of the facsimile data received by the one of first and second facsimile portions 116, 116A. Further, each of first facsimile portion 116 and second facsimile portion 116A converts the data stored in HDD 115 to facsimile data, and transmits the same to a facsimile machine connected to the PSTN.

Communication I/F portion 112 is an interface for connecting MFP 100 to a network. Communication I/F portion 112 communicates with another computer connected to the network, using a communication protocol such as the transmission control protocol (TCP) or the file transfer protocol (FTP). It is noted that the protocol for communication is not particularly limited; any protocol can be used. Further, the network to which communication I/F portion 112 is connected is, for example, a local area network (LAN). It may be connected in a wired or wireless manner. The network is not necessarily the LAN; it may be a wide area network (WAN), a network using the public switched telephone networks (PSTN), or the like. Furthermore, the network is connected to the Internet, so that it is possible for MFP 100 to communicate with a computer, such as a server, connected to the Internet.

External storage device 117, which is controlled by CPU 111, is mounted with a compact disc read-only memory (CD-ROM) 118 or a semiconductor memory. CPU 111 is capable of accessing CD-ROM 118 or the semiconductor memory via external storage device 117. CPU 111 loads the program recorded on CD-ROM 118 or the semiconductor memory mounted on external storage device 117, into RAM 114 for execution. It is noted that the program executed by CPU 111 is not restricted to the program recorded on CD-ROM 118. CPU 111 may load a program stored in HDD 115, into RAM 114 for execution. In this case, via the network to which communication I/F portion 112 is connected, another computer connected to the network may rewrite the program stored in HDD 115 of MFP 100, or additionally write a new program therein. Further, MFP 100 may download a program from another computer connected to the network, and store the program in HDD 115. As used herein, the "program" includes, not only the program which CPU 111 can execute directly, but also a source program, a compressed program, an encrypted program, and so on.

It is noted that the medium for storing a program executed by CPU 111 is not restricted to CD-ROM 118. It may be an optical disc (magneto-optical (MO) disc, mini disc (MD), digital versatile disc (DVD)), an IC card, an optical card, or a semiconductor memory such as a mask ROM, an erasable programmable ROM (EPROM), an electrically erasable and programmable ROM (EEPROM), or the like.

Operation panel 160 includes display portion 161 and an operation portion 163. Display portion 161 is a display such as a liquid crystal display (LCD) or an organic electro-luminescence display (ELD), and displays an instruction menu for a user, information about acquired image data, and so on. Operation portion 163 includes touch panel 165 and hard key portion 167 made up of a plurality of hard keys. The hard keys included in hard key portion 167 each include a contact switch, which is connected to CPU 111. Each hard key, when depressed by an operation user, closes its contact to close a circuit connected to CPU 111. Each hard key closes the circuit while being depressed by an operation user who operates MFP 100, whereas it opens the circuit while not being depressed by the operation user.

When a plurality of keys included in hard key portion 167 are depressed, operation portion 163 accepts input data, such as instructions, characters, and numerical characters, according to the depressed keys. Touch panel 165 is disposed on an upper or lower surface of display portion 161, and outputs the coordinates of a position pushed by the operation user to CPU 111. Touch panel 165 detects the position designated by the operation user with his/her finger or a stylus pen, and outputs the coordinates of the detected position to CPU 111. Touch panel 165 preferably has a size equal to or greater than that of the display surface of display portion 161. As touch panel 165 is disposed on the surface of display portion 161, when the operation user designates a position on the display surface of display portion 161, touch panel 165 outputs the coordinates of the position that the operation user has designated on the display surface of display portion 161, to CPU 111. Touch panel 165 may be, for example, of a resistive type, a surface acoustic wave type, an infrared ray type, an electromagnetic induction type, or a capacitance type, although it is not limited to these types.

Operations that can be accepted by operation portion 163 include an operation of depressing a key included in hard key portion 167 and an operation of designating a position on touch panel 165. Hard key portion 167 includes four hard keys 167A to 167D having the characters "BOX", "FAX", "COPY", and "ECO" respectively displayed thereon. Three hard keys 167A, 167B, and 167C with the characters "BOX", "FAX", and "COPY", respectively, are process-switching keys assigned with process-switching operations for designating switching of the process to be executed by MFP 100. Hard key 167D with the characters "ECO" is a mode-switching key assigned with a mode-switching operation for designating switching of the mode of MFP 100 from a normal mode to an energy-saving mode in which less electricity is consumed. When hard key 167A, 167B, or 167C is depressed, operation portion 163 accepts the corresponding process-switching operation. When hard key 167D is depressed, operation portion 163 accepts the mode-switching operation.

Figure 5:
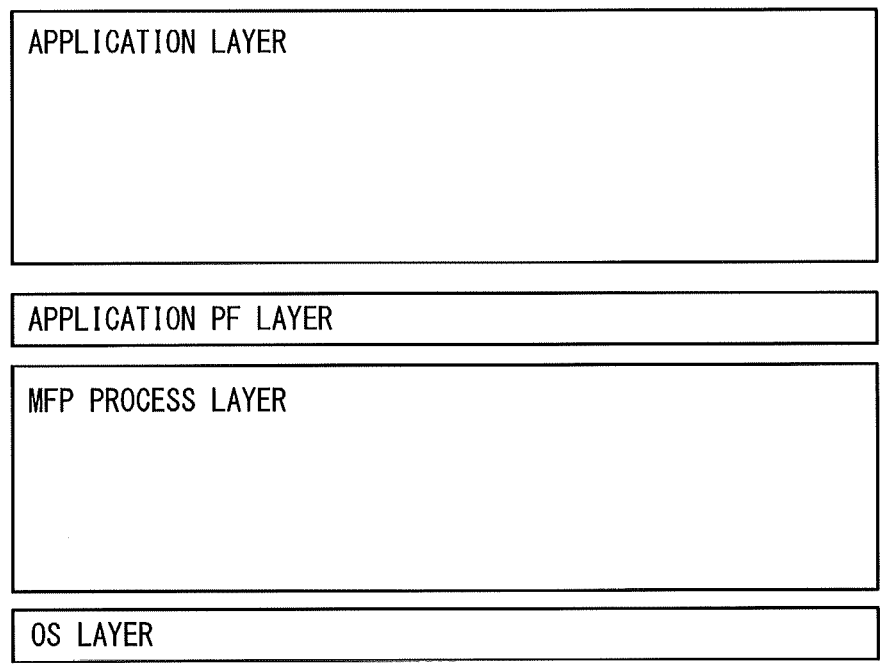
FIG. 5 shows an example of the software architecture of a CPU included in the MFP.

FIG. 5 shows an example of the software architecture of the CPU included in the MFP. Referring to FIG. 5, in CPU 111, an operating system (OS) layer is formed as the bottom layer, and an MFP process layer is formed above the OS layer. Above the MFP process layer, an application platform (PF) layer is formed, and an application layer is formed above the application PF layer.

A task for CPU 111 to execute an OS program belongs to the OS layer. The task belonging to the OS layer performs a process of controlling the hardware resources in MFP 100. Here, the hardware resources include communication I/F portion 112, ROM 113, RAM 114, HDD 115, first facsimile portion 116, second facsimile portion 116A, external storage device 117, automatic document feeder 120, first document reading portion 130, second document reading portion 130A, image forming portion 140, paper feeding portion 150, and operation panel 160. The task belonging to the OS layer controls the hardware resources in accordance with an operating command input from the MFP process layer.

A task for CPU 111 to execute an application program belongs to the application layer. In the case where two or more application programs are installed into MFP 100, two or more tasks for executing the respective application programs may belong to the application layer. The application programs include programs for customizing a user interface and the like so as to cause MFP 100 to perform the copying process, scanning process, printing process, facsimile transmitting/ receiving process, data transmitting/receiving process, and so on. It is noted that the application programs are not restricted to the above-described programs; there may be another application program. An application program is described, for example, in a programming language such as Python, although the language is not particularly limited.

The task for executing an application program performs a plurality of types of processes determined by the application program. The plurality of types of processes include a process of causing a task belonging to the MFP process layer to perform a process to be performed in the MFP process layer. In the case of causing the task belonging to the MFP process layer to perform a process, the task for executing the application program outputs an application command. The application command is a command which has been released as an application program interface (API). This facilitates creation of an application program for causing MFP 100 to perform a process. Releasing something means that a third party other than the manufacturer of MFP 100 can use it. The third party is able to use the application commands to develop an application program that can be installed into MFP 100.

The application PF layer, located between the application layer and the MFP process layer, has belonging thereto a task for arbitrating a plurality of tasks belonging to the application layer and also controlling the application commands output from the plurality of tasks belonging to the application layer. The application PF layer accepts the application commands output from the plurality of tasks belonging to the application layer, converts the application commands into internal commands, and outputs the obtained internal commands to the MFP process layer.

Application commands are associated with internal commands in advance. For example, a commands correspondence table may be stored. One application command may correspond to one internal command, or one application command may correspond to a set of two or more internal commands. Further, two or more application commands of different versions may correspond to one internal command or to a set of two or more internal commands. This can address the case where a plurality of application programs are of different versions. The internal command is a command which depends upon the hardware resource(s) in MFP 100. Internal commands are not released usually, although they may be released.

The MFP process layer, located between the application PF layer and the OS layer, has belonging thereto a task for CPU 111 to execute an MFP control program The MFP process layer has belonging thereto a task for converting an internal command, output from a task belonging to the application PF layer, into an operating command which can be interpreted by a task belonging to the OS layer, and outputting the operating command to the task belonging to the OS layer for controlling the hardware resources. While an internal command may be actually converted into one or more operating commands which can be executed by a task belonging to the OS layer, for the convenience sake, it is here assumed that one internal command is converted into one operating command executable by the task belonging to the OS layer.

Figure 6:
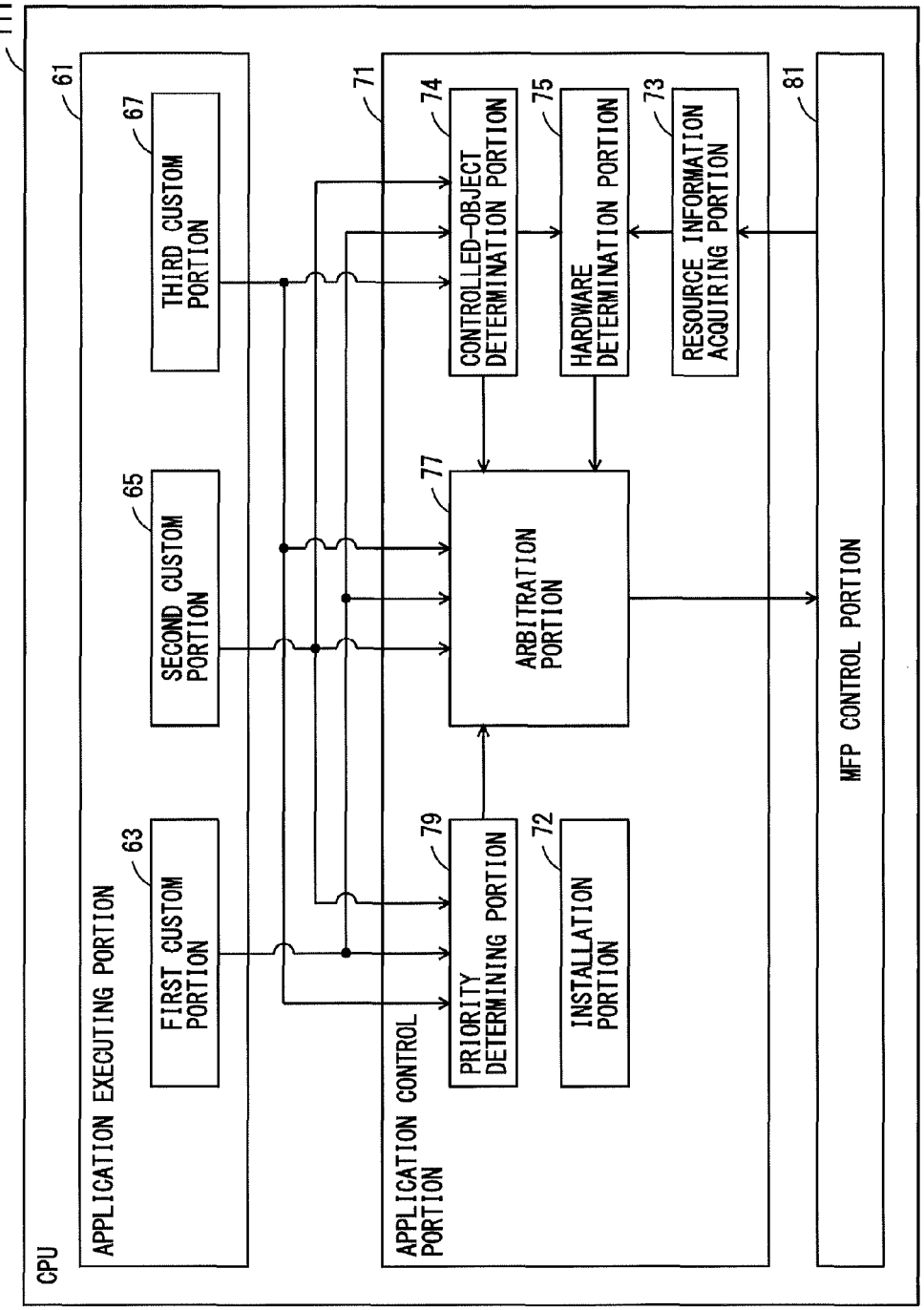
FIG. 6 is a block diagram showing, by way of example, the functions of the CPU included in the MFP according to an embodiment of the present invention.

FIG. 6 is a block diagram showing, by way of example, the functions of the CPU included in the MFP according to an embodiment of the present invention. The functions shown in FIG. 6 are implemented by CPU 111 included in MFP 100 as CPU 111 executes programs stored in ROM 113, HDD 115, or CD-ROM 118. Specifically, the functions are implemented by CPU 111 as CPU 111 executes an OS program, an MFP control program, an application control program, and an application program.

Referring to FIG. 6, CPU 111 includes an application executing portion 61, an application control portion 71, and an MFP control portion 81. Application executing portion 61 belongs to the application layer in the software architecture shown in FIG. 5. Application executing portion 61 is a function implemented by the task for CPU 111 to execute an application program.

The application program is, for example, a program for executing a process of managing data stored in BOX, which is a plurality of storage areas included in HDD 115, a program for executing a process of transmitting facsimile data, or a program for executing a process of forming an image of a document. It is noted that the application program is not limited to one of the above-described programs; it may be a program for executing another kind of process.

It is here assumed that one application program is installed into MFP 100. Application executing portion 61 includes a first custom portion 63, a second custom portion 65, and a third custom portion 67 which are three tasks that each execute the installed application program. Each of first, second, and third custom portions 63, 65, and 67 outputs an application command determined by the application program, to application control portion 71. While it is here assumed that CPU 111 executes one application program, the number of application programs executed by CPU 111 is not limited to one; it may be one or more.

Application control portion 71 is a function implemented by the task for CPU 111 to execute the application control program. Application control portion 71 belongs to the application PF layer in the software architecture shown in FIG. 5.

Application control portion 71 includes an installation portion 72, a resource information acquiring portion 73, a controlled-object determination portion 74, a hardware determination portion 75, an arbitration portion 77, and a priority determining portion 79. Installation portion 72 installs an application program into MFP 100 in accordance with an installation instruction input by a user. An installation instruction may be received from one of PCs 200, 200A, and 200B by communication I/F portion 112, or may be input into operation panel 160. When a user operates operation panel 160 to input an installation instruction, installation portion 72 accepts the installation instruction from operation portion 163. When a user operates one of PCs 200, 200A, and 200B to remotely control MFP 100 to input an installation instruction, installation portion 72 accepts the installation instruction that communication I/F portion 112 receives from the one of PCs 200, 200A, and 200B.

Installation portion 72 acquires the application program designated by the user. In the case where a user who wishes to cause MFP 100 to read an application program mounts CD-ROM 118 storing the application program on external storage device 117, installation portion 72 reads and acquires the application program stored in CD-ROM 118 via external storage device 117. In the case where a user inputs into MFP 100 an instruction to download an application program stored in a computer connected to network 3, installation portion 72 downloads and acquires the application program via communication I/F portion 112. Installation portion 72 stores the acquired application program into HDD 115. Application executing portion 61 described above reads the application program stored in HDD 115 by installation portion 72, into RAM 114 for execution.

Priority determining portion 79 determines the priorities of first, second, and third custom portions 63, 65, and 67 included in application executing portion 61. Specifically, first custom portion 63, second custom portion 65, and third custom portion 67 are formed in CPU 111 as they execute an application program. Therefore, the priorities of first, second, and third custom portions 63, 65, and 67 are determined at the times when the respective portions execute the application program.

For example, the priority may be determined in accordance with the user who operates MFP 100 and who has instructed the execution of the application program. The users who operate MFP 100 include a user who operates operation panel 160 directly and a user who operates one of PCs 200, 200A, and 200B to operate MFP 100 remotely. The priorities may be set for the respective users of MFP 100, and the priorities of first, second, and third custom portions 63, 65, and 67 may be set to the same as those of the users who have instructed the execution of the application program in accordance with which the respective custom portions 63, 65, and 67 were formed.

Alternatively, priority determining portion 79 may set the priorities of first custom portion 63, second custom portion 65, and third custom portion 67 in accordance with the order in which the respective custom portions output application commands. Specifically, priority determining portion 79 may give a higher priority to the one of first, second, and third custom portions 63, 65, and 67 that has output an application command earlier than the others. Priority determining portion 79 outputs the determined priorities of first, second, and third custom portions 63, 65, and 67, to arbitration portion 77.

Arbitration portion 77 converts the application command output from one of first, second, and third custom portions 63, 65, and 67, into an internal command in accordance with a commands correspondence table, and outputs the obtained internal command to MFP control portion 81. The commands correspondence table associates one application command with one or more internal commands. The application commands included in the commands correspondence table may include the application commands of the same type but of different versions. In such a case, each of the application commands of different versions is associated with one or more internal commands. This enables installation of application programs having application commands of different versions described therein. When a new application command appears, the commands correspondence table is updated with a commands correspondence table in which the new application command is associated with one or more internal commands. This enables installation of an application program having the new application command described therein.

Controlled-object determination portion 74 receives an application command from each of first, second, and third custom portions 63, 65, and 67. Controlled-object determination portion 74 determines whether two or more application commands respectively output from two or more of first, second, and third custom portions 63, 65, and 67 include two or more application commands corresponding to the hardware resource of the same type. Controlled-object determination portion 74 outputs the result of determination to hardware determination portion 75 and arbitration portion 77. Controlled-object determination portion 74 may take, as a target of determination, any application command that is input before arbitration portion 77, which will be described later, converts a first application command into an internal command. In this case, when a second application command is input after the first application command was input and before it is converted by arbitration portion 77 into an internal command, then the first and second application commands are taken as the targets of determination by controlled-object determination portion 74. Further, when a third application command is input before the second application command is converted by arbitration portion 77 into an internal command, then the first, second, and third application commands are taken as the targets of determination by controlled-object determination portion 74.

The results of determination made by controlled-object determination portion 74 include the following: a result of determination that there are two or more application commands corresponding to the hardware resource of the same type in the two or more application commands respectively output from two or more of first, second, and third custom portions 63, 65, and 67; and a result of determination that there are no such application commands. The result of determination that there are two or more application commands corresponding to the hardware resource of the same type includes the type of the hardware resource, while the result of determination that there are no such application commands corresponding to the hardware resource of the same type includes a signal (hereinafter, referred to as "absence signal") indicating the absence of such application commands.

The hardware resources include HDD 115, first facsimile portion 116, second facsimile portion 116A, communication I/F portion 112, external storage device 117, automatic document feeder 120, first document reading portion 130, second document reading portion 130A, image forming portion 140, paper feeding portion 150, and operation panel 160. The types of hardware resources indicate the functions executed by the hardware resources, which include: an internal data management function for HDD 115, a facsimile transmitting function for first facsimile portion 116 and second facsimile portion 116A, a data transmitting function for communication I/F portion 112, an external data management function for external storage device 117, a document feeding function for automatic document feeder 120, a document reading function for first document reading portion 130 and second document reading portion 130A, an image forming function for image forming portion 140, a paper feeding function for paper feeding portion 150, and a user interface function for operation panel 160. The type of hardware resource to be controlled by an internal command is determined in advance for the internal command.

For more specific description, it is here assumed that a first application command is input from first custom portion 63 and a second application command is input from second custom portion 65. When the first application command and the second application command are identical to each other, controlled-object determination portion 74 determines that they correspond to the hardware resource of the same type. When the first application command and the second application command are different from each other, controlled-object determination portion 74 converts the application commands into internal commands, and specifies the types of hardware resources to be controlled by the respective internal commands. Even in the case where the first application command and the second application command are different from each other, a first internal command obtained by converting the first application command and a second internal command obtained by converting the second application command may be identical to each other. When the first internal command and the second internal command are identical to each other, controlled-object determination portion 74 determines that the type of the hardware resource to be controlled by the first internal command and the type of the hardware resource to be controlled by the second internal command are the same. Further, even in the case where the first internal command and the second internal command are different from each other, the type of the hardware resource to be controlled by the first internal command and the type of the hardware resource to be controlled by the second internal command may be the same.

Furthermore, there may be a case where one application command is converted into a plurality of internal commands. In such a case, one of the plurality of first internal commands obtained by converting the first application command may be identical to one of the plurality of second internal commands obtained by converting the second application command.

Resource information acquiring portion 73 acquires resource information from MFP control portion 81. The resource information is information on the hardware resources included in MFP 100. The resource information includes, for each hardware resource type, the number of hardware resources of the relevant type included in MFP 100. The resource information also includes the functions of the respective types of hardware resources.

When MFP 100 is turned on, resource information acquiring portion 73 acquires the resource information from MFP control portion 81. Resource information acquiring portion 73 stores the acquired resource information in HDD 115, and also outputs the same to hardware determination portion 75. As CPU 111 executes an application program, first, second, and third custom portions 63, 65, and 67 are formed in application executing portion 61. Therefore, each time CPU 111 executes the application program, resource information acquiring portion 73 outputs the resource information to first, second, and third custom portions 63, 65, and 67. It is noted that resource information acquiring portion 73 may acquire the resource information from MFP control portion 81 at the time when the application control program is installed into MFP 100.

FIG. 7 shows an example of the resource information. Referring to FIG. 7, the resource information includes resource records which determine the numbers of connections for the respective types of hardware resources. Each resource record includes a "function" field, a "hardware resource name" field, and a "number of connections" field. In the "hardware resource name" field, the name assigned to the hardware resource of that type is set. In the "function" field, function identification information for identifying the function of the hardware resource of that type is set. In the "number of connections" field, the number of hardware resources of that type connected is shown. In the resource record having the name "document reading device" set in the "hardware resource name" field, the function identification information, "document reading", for identifying the document reading function is set in the "function" field, and "2" is set in the "number of connections" field because MFP 100 includes first document reading portion 130 and second document reading portion 130A. In the resource record having the name "image forming device" set in the "hardware resource name" field, the function identification information, "image forming", for identifying the image forming function is set in the "function" field, and "1" is set in the "number of connections" field because MFP 100 includes image forming portion 140. In the resource record having the name "facsimile device" set in the "hardware resource name" field, the function identification information, "facsimile transmission", for identifying the facsimile transmitting function is set in the "function" field, and "2" is set in the "number of connections" field because MFP 100 includes first facsimile portion 116 and second facsimile portion 116A.

Returning to FIG. 6, hardware determination portion 75 receives the resource information from resource information acquiring portion 73, and receives the result of determination from controlled-object determination portion 74. In the case where the result of determination input from controlled-object determination portion 74 includes the type of hardware resource, hardware determination portion 75 determines whether the number of hardware resources specified by that type is one or more, on the basis of the resource information, and outputs the result of determination to arbitration portion 77. In the case where the result of determination input from controlled-object determination portion 74 includes the "absence" signal described previously, hardware determination portion 75 outputs nothing to arbitration portion 77.

Arbitration portion 77 receives an application command from each of first, second, and third custom portions 63, 65, and 67, and receives the priority of each of first, second, and third custom portions 63, 65, and 67 from priority determining portion 79. When arbitration portion 77 receives application commands respectively from at least two of first, second, and third custom portions 63, 65, and 67, and receives the result of determination including the type of hardware resource from controlled-object determination portion 74, arbitration portion 77 also receives the result of determination from hardware determination portion 75. When arbitration portion 77 receives application commands respectively from at least two of first, second, and third custom portions 63, 65, and 67, and receives the result of determination including the "absence" signal from controlled-object determination portion 74, arbitration portion 77 receives nothing from hardware determination portion 75.

Arbitration portion 77 converts the application commands input respectively from at least two of first, second, and third custom portions 63, 65, and 67, into internal commands, and outputs the obtained internal commands to MFP control portion 81 in accordance with the priorities input from priority determining portion 79. When outputting two or more internal commands to MFP control portion 81, arbitration portion 77 controls the timings for outputting the two or more internal commands to MFP control portion 81 on the basis of the result of determination input from controlled-object determination portion 74 and, when the result of determination input from controlled-object determination portion 74 includes the type of hardware resource, also on the basis of the result of determination input from hardware determination portion 75.

MFP control portion 81 is a function implemented by the task for CPU 111 to execute the MFP control program. MFP control portion 81 belongs to the MFP process layer in the software architecture shown in FIG. 5. MFP control portion 81 receives an internal command from arbitration portion 77 in application control portion 71, and executes processing determined by the internal command.

The processing determined by an internal command includes processing for controlling a hardware resource included in MFP 100, and data processing. The hardware resources included in MFP 100 include HDD 115, first facsimile portion 116, second facsimile portion 116A, communication I/F portion 112, external storage device 117, automatic document feeder 120, first document reading portion 130, second document reading portion 130A, image forming portion 140, paper feeding portion 150, and operation panel 160. The data processing is not particularly limited, but may be sharpening, synthesis, enlargement, reduction, or other processing performed on image data.

When MFP control portion 81 executes processing for controlling a hardware resource included in MFP 100, MFP control portion 81 converts the internal command into an operating command, and outputs the operating command to a task for CPU 111 to execute the operating program. The operating command is a command which can be interpreted by the task for CPU 111 to execute the operating program.

The task for CPU 111 to execute the operating program belongs to the OS layer in the software architecture shown in FIG. 5.

For the purpose of describing the processing by arbitration portion 77 specifically, it is here assumed that arbitration portion 77 receives a first application command from first custom portion 63 and then a second application command from second custom portion 65. It is also assumed that the priority determined for first custom portion 63 by priority determining portion 79 is higher than that determined for second custom portion 65.

In this case, arbitration portion 77 receives a result of determination from controlled-object determination portion 74 and, when the result of determination input from controlled-object determination portion 74 includes the type of hardware resource, arbitration portion 77 also receives a result of determination from hardware determination portion 75. When the result of determination input from controlled-object determination portion 74 includes the "absence" signal, arbitration portion 77 receives nothing from hardware determination portion 75.

Arbitration portion 77 converts the first application command into a first internal command, and the second application command into a second internal command. Arbitration portion 77 outputs the first internal command having the highest priority, and then the second internal command having the second highest priority, to MFP control portion 81. At this time, arbitration portion 77 controls the timing of outputting the second internal command, on the basis of the result of determination input from controlled-object determination portion 74 and the result of determination input from hardware determination portion 75.

When the result of determination input from controlled-object determination portion 74 includes the type of hardware resource, arbitration portion 77 also receives a result of determination from hardware determination portion 75. When the result of determination input from hardware determination portion 75 shows that the number of hardware resources of the relevant type is one, arbitration portion 77 outputs the first internal command to MFP control portion 81, and outputs the second internal command to MFP control portion 81 only after MFP control portion 81 has finished the processing corresponding to the first internal command. When the result of determination input from hardware determination portion 75 shows that the number of hardware resources of the relevant type is two or more, arbitration portion 77 outputs the first internal command to MFP control portion 81, and outputs the second internal command to MFP control portion 81 while the processing corresponding to the first internal command is being executed in MFP control portion 81.

When the result of determination input from controlled-object determination portion 74 includes the "absence" signal, arbitration portion 77 receives nothing from hardware determination portion 75. In this case, arbitration portion 77 outputs the first internal command to MFP control portion 81, and outputs the second internal command to MFP control portion 81 while the processing corresponding to the first internal command is being executed in MFP control portion 81.

Figure 8:
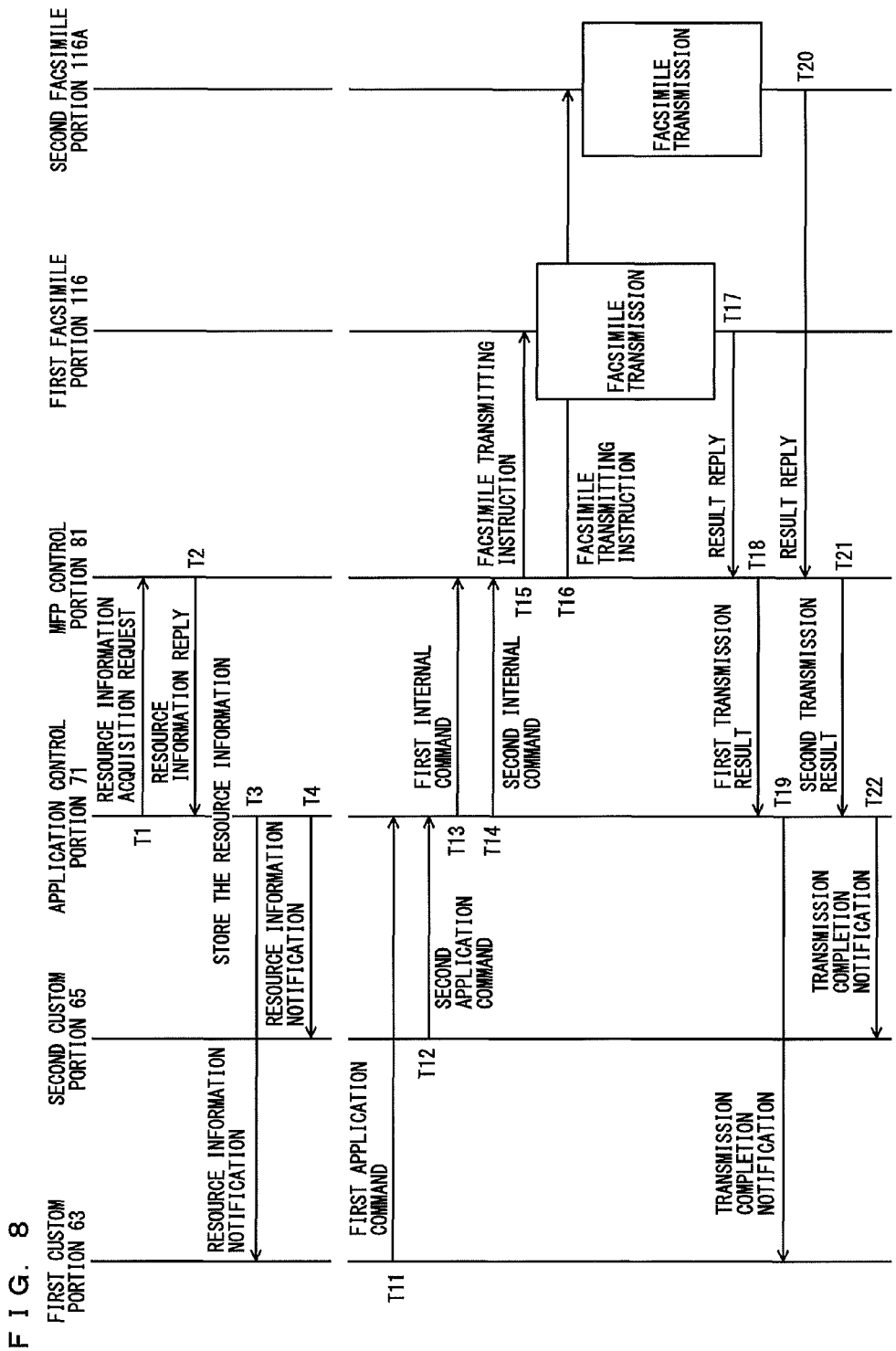
FIG. 8 is a first diagram illustrating an example of the temporal flow of an application control process.

FIG. 8 is a first diagram illustrating an example of the temporal flow of the application control process. Referring to FIG. 8, time flows from the top downward. Time axes are shown, starting from the left, for first custom portion 63, second custom portion 65, application control portion 71, MFP control portion 81, first facsimile portion 116, and second facsimile portion 116A. FIG. 8 shows the case where first custom portion 63 outputs a first application command for causing one of first and second facsimile portions 116, 116A to perform facsimile transmission and second custom portion 65 outputs a second application command for causing one of first and second facsimile portions 116, 116A to perform facsimile transmission.

First, when MFP 100 is started, application control portion 71 outputs a resource information acquisition request to MFP control portion 81 (T1). On receipt of the resource information acquisition request, MFP control portion 81 collects the resource information from the operating system. MFP control portion 81 then outputs a resource information reply including the resource information, to application control portion 71 (T2). Application control portion 71 stores the received resource information into HDD 115. When an application program is executed and first custom portion 63 is started, application control portion 71 outputs the resource information to first custom portion 63 (T3). Further, when the application program is executed and second custom portion 65 is started, application control portion 71 outputs the resource information to second custom portion 65 (T4). Each of first custom portion 63 and second custom portion 65 determines the setting of processing to be executed by MFP 100, on the basis of the resource information. For example, in a setting screen for causing MFP 100 to execute the document reading function, the setting of double-sided reading is enabled if automatic document feeder 120 has a document reversing function, whereas the setting is disabled if automatic document feeder 120 does not have the function.

Thereafter, when first custom portion 63 outputs a first application command, application control portion 71 accepts the first application command (T11). When second custom portion 65 outputs a second application command, application control portion 71 accepts the second application command (T12).

Application control portion 71 converts the first application command into a first internal command, and the second application command into a second internal command. In this example, the first internal command and the second internal command correspond to the hardware resource of the same type, i.e. first and second facsimile portions 116, 116A, and the number of hardware resources of that type is more than one. Accordingly, application control portion 71 outputs the first internal command to MFP control portion 81 (T13) and also outputs the second internal command to MFP control portion 81 (T14).

When MFP control portion 81 receives the first internal command, MFP control portion 81 causes first facsimile portion 116 to perform facsimile transmission (T15). When receiving the second internal command, MFP control portion 81 causes second facsimile portion 116A to perform facsimile transmission (T16). This causes first facsimile portion 116 and second facsimile portion 116A to perform facsimile transmission concurrently. When first facsimile portion 116 finishes the facsimile transmission (T17), MFP control portion 81 outputs a first transmission result to application control portion 71 (T18). On receipt of the first transmission result, application control portion 71 outputs a transmission completion notification to first custom portion 63 (T19). On the other hand, when second facsimile portion 116A finishes the facsimile transmission (T20), MFP control portion 81 outputs a second transmission result to application control portion 71 (T21). On receipt of the second transmission result, application control portion 71 outputs a transmission completion notification to second custom portion 65 (T22). It is noted that when the facsimile transmission by second facsimile portion 116A is completed before the completion of the facsimile transmission by first facsimile portion 116, the process steps T20 to T22 precede the process steps T17 to T19.

Figure 9:
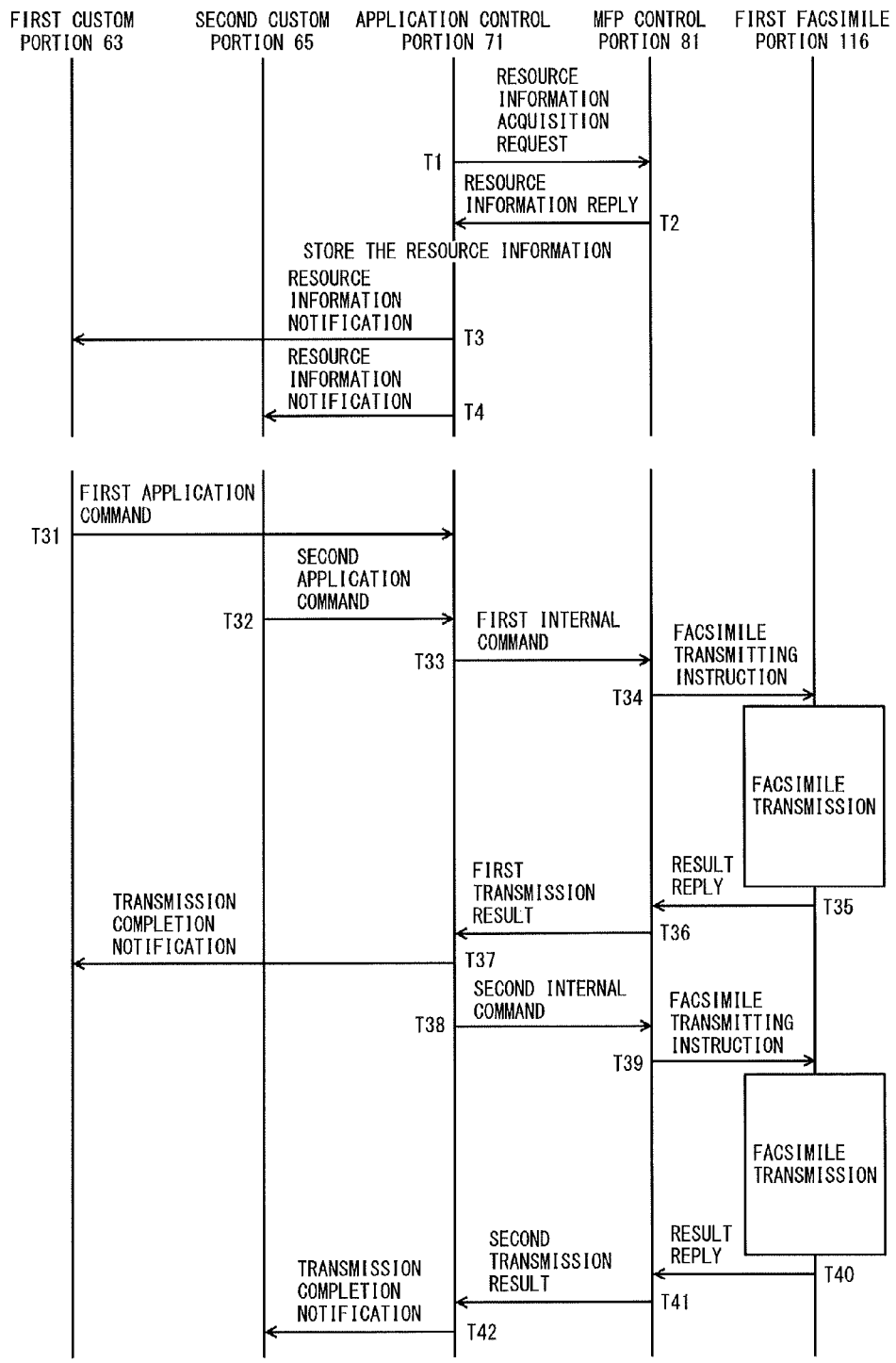
FIG. 9 is a second diagram illustrating another example of the temporal flow of the application control process.

FIG. 9 is a second diagram illustrating an example of the temporal flow of the application control process. FIG. 9 shows the temporal flow of the application control process in the case where MFP 100 does not have second facsimile portion 116A but has first facsimile portion 116 alone as the hardware resource corresponding to the facsimile transmitting function. Referring to FIG. 9, as in FIG. 8, time flows from the top downward and, starting from the left, the time axes for first custom portion 63, second custom portion 65, application control portion 71, MFP control portion 81, and first facsimile portion 116 are shown. In FIG. 9, it is assumed that first custom portion 63 outputs a first application command for causing first facsimile portion 116 to perform facsimile transmission, and second custom portion 65 outputs a second application command for causing first facsimile portion 116 to perform facsimile transmission.

The process steps T1 to T4 are identical to those shown in FIG. 8, and thus, a description thereof will not be repeated here. When first custom portion 63 outputs a first application command, application control portion 71 accepts the first application command (T31). When second custom portion 65 outputs a second application command, application control portion 71 accepts the second application command (T32).

Application control portion 71 converts the first application command and the second application command into a first internal command and a second internal command, respectively. Application control portion 71 outputs the first internal command to MFP control portion 81 (T33). On receipt of the first internal command, MFP control portion 81 causes first facsimile portion 116 to perform facsimile transmission (T34). This causes first facsimile portion 116 to start facsimile transmission. When first facsimile portion 116 finishes the facsimile transmission (T35), MFP control portion 81 outputs a first transmission result to application control portion 71 (T36). When application control portion 71 receives the first transmission result, application control portion 71 outputs a transmission completion notification to first custom portion 63 (T37).

Application control portion 71 outputs the second internal command to MFP control portion 81 (T38) after the first transmission result is input from MFP control portion 81. On receipt of the second internal command, MFP control portion 81 causes first facsimile portion 116 to perform facsimile transmission (T39). This causes first facsimile portion 116 to start facsimile transmission. When first facsimile portion 116 finishes the facsimile transmission (T40), MFP control portion 81 outputs a second transmission result to application control portion 71 (T41). When application control portion 71 receives the second transmission result, application control portion 71 outputs a transmission completion notification to second custom portion 65 (T42).

Figure 10:
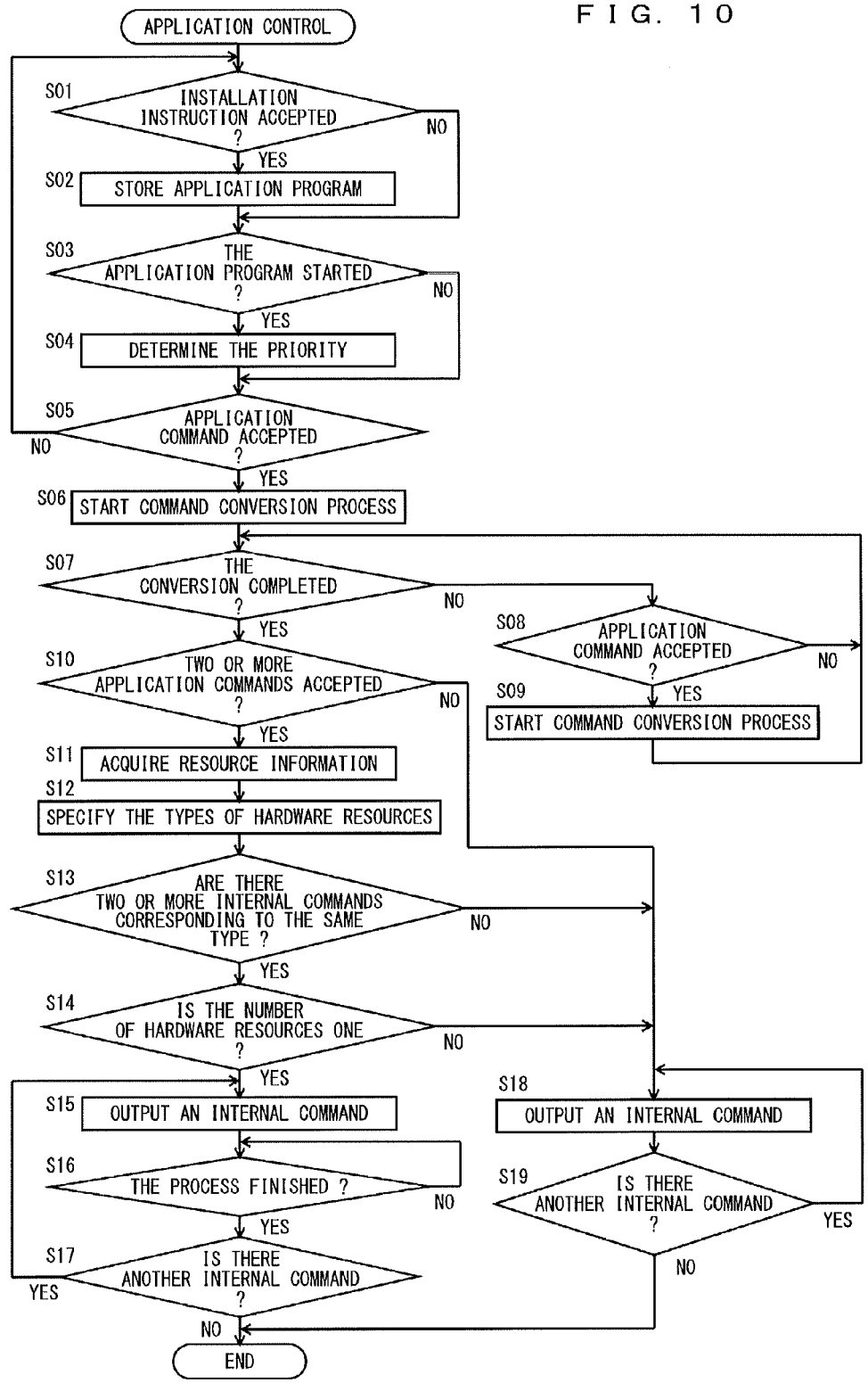
FIG. 10 is a flowchart illustrating an example of the flow of the application control process.

FIG. 10 is a flowchart illustrating an example of the flow of the application control process. The application control process is carried out by CPU 111 included in MFP 100 as CPU 111 executes the application control program stored in ROM 113, HDD 115, or CD-ROM 118. Referring to FIG. 10, CPU 111 determines whether an installation instruction has been accepted (step S01). If so ("YES" in step S01), the process proceeds to step S02; otherwise ("NO" in step S01), the process proceeds to step S03. In step S02, CPU 111 stores into HDD 115 an application program which is input from the outside along with the installation instruction. The process then proceeds to step S03.

In the following step S03, CPU 111 determines whether the application program has been started. If CPU 111 detects an operation for instructing to start the application program, CPU 111 determines that the application program has been started. If CPU 111 detects the start of the application program, the process proceeds to step S04; otherwise, the process proceeds to step S05. In step S04, CPU 111 determines the priority. When the application program is started in step S03, a task (one of first, second, and third custom portions 63, 65, and 67) is formed in CPU 111. Therefore, CPU 111 determines the priority of the task. For example, the priority is determined in accordance with the user who operates MFP 100 and who has instructed to execute the application program. In this case, the priorities are set in advance for the respective users of MFP 100, and CPU 111 determines the priority of the task for executing the application program, so as to be the same as that of the user who has instructed to execute the application program.

In step S05, CPU 111 determines whether an application command has been accepted. In the case where the task for executing the application program (one of first, second, and third custom portions 63, 65, and 67) outputs an application command, CPU 111 accepts the application command. If CPU 111 has accepted the application command, the process proceeds to step S06; otherwise, the process returns to step S01.

In step S06, CPU 111 starts a command conversion process, and the process proceeds to step S07. The command conversion process, which will be described in detail later, is a process of converting an application command into an internal command.

In step S07, CPU 111 determines whether the conversion into the internal command has been completed. If the command conversion process started in step S06 is finished, CPU 111 determines that the conversion has been completed. If the conversion into the internal command has been completed, the process proceeds to step S10; otherwise, the process proceeds to step S08. In step S08, as in step S05, CPU 111 determines whether an application command has been accepted. If so, the process proceeds to step S09; otherwise, the process returns to step S07. In step S09, CPU 111 starts a command conversion process, and the process returns to step S07. In other words, in the case where a second application command is accepted while a first application command is being converted into an internal command, the process proceeds to step S10 only after the second application command has been converted into an internal command.

In step S10, CPU 111 determines whether the number of application commands accepted in step S05 or S08 is two or more. If two or more application commands have been accepted, the process proceeds to step S11; otherwise, the process proceeds to step S18. In step S11, CPU 111 acquires resource information. CPU 111 reads the resource information stored in HDD 115, to acquire it. CPU 111 then specifies the types of hardware resources corresponding respectively to the two or more internal commands obtained in the command conversion processes that were started in steps S06 and S09 (step S12). CPU 111 determines whether there are two or more internal commands that specify the same type of hardware resource (step S13). If there are two or more internal commands corresponding to the same type of hardware resource, the process proceeds to step S14; otherwise, the process proceeds to step S18.

In step S14, CPU 111 specifies, on the basis of the resource information acquired in step S11, the hardware resource(s) corresponding to the hardware resource type specified by the two or more internal commands, and determines whether the number of hardware resource(s) specified is one. If the number of hardware resources of the relevant type is one, the process proceeds to step S15; if there are two or more hardware resources of the relevant type, the process proceeds to step S18. In step S15, CPU 111 outputs an internal command to the task for executing the MFP control program (i.e. MFP control portion 81). CPU 111 then determines whether the task for executing the MFP control program (MFP control portion 81) has finished the process determined by the internal command (step S16). CPU 111 is in a standby mode until the process determined by the internal command is finished ("NO" in step S16), and once the process determined by the internal command is finished ("YES" in step S16), the process proceeds to step S17.

In step S17, CPU 111 determines whether there is an internal command which has not yet been output. If so, the process returns to step S15; otherwise, the process is terminated.

On the other hand, in step S18, CPU 111 outputs an internal command to the task for executing the MFP control program (MFP control portion 81). CPU 111 then determines whether there is an internal command which has not yet been output (step S19). If so, the process returns to step S18; otherwise, the process is terminated.

Figure 11:
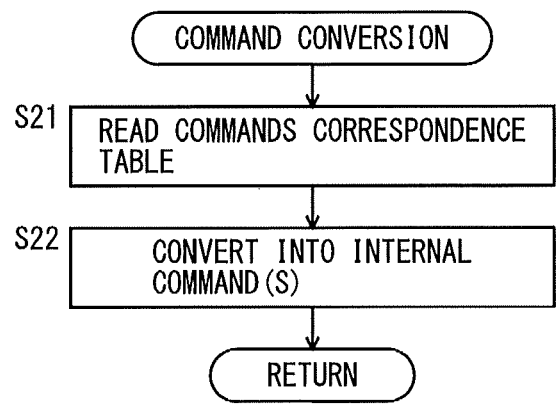
FIG. 11 is a flowchart illustrating an example of the flow of a command conversion process.

FIG. 11 is a flowchart illustrating an example of the flow of the command conversion process. The command conversion process is a process started in step S06 or S09 in FIG. 10. Referring to FIG. 11, in step S21, CPU 111 reads a commands correspondence table stored in HDD 115. The commands correspondence table associates one application command with one or more internal commands. CPU 111 refers to the commands correspondence table to convert the application command into one or more internal commands (step S22).

As described above, in MFP 100 according to the present embodiment, in the case where application executing portion 61 which executes an application program outputs a released application command, application control portion 71 converts the application command into an internal command and outputs the obtained internal command to MFP control portion 81. MFP control portion 81 then executes a process predetermined for the internal command, to control a hardware resource. When a new application command appears, it is only necessary to change a commands correspondence table, which associates application commands with internal commands, in order to convert the new application command into an existing internal command. There is no need to change MFP control portion 81.

Further, with the commands correspondence table, an application command can be converted into an internal command corresponding to a hardware resource included in MFP 100. This makes it possible to install, into MFP 100, an application program that has been developed for an image forming apparatus which includes hardware resources different from those of MFP 100.

Furthermore, even when a hardware resource in MFP 100 is changed, the commands correspondence table can be changed such that an application command is converted into an internal command corresponding to the changed hardware resource, without the need of changing application control portion 71. Accordingly, there is no need to change the application control program, and a hardware resource can be changed easily. Further, the same application control program can be installed into the MFPs including different hardware resources.

In the case where first custom portion 63 outputs a first application command and second custom portion 65 outputs a second application command, controlled-object determination portion 74 determines whether the hardware resource to be controlled by a first internal command obtained by converting the first application command and the hardware resource to be controlled by a second internal command obtained by converting the second application command are of the same type. Arbitration portion 77 controls the timings for outputting the first internal command and the second internal command to MFP control portion 81 on the basis of the result of determination made by controlled-object determination portion 74. This makes it possible to control the hardware resources even when a plurality of application programs are executed.

Furthermore, in the case where the first internal command and the second internal command control the hardware resource of the same type, arbitration portion 77 determines whether the number of hardware resources of the type to be controlled by the first and second internal commands is one. If there is only one hardware resource of the type to be controlled by the first and second internal commands, arbitration portion 77 outputs the first internal command to MFP control portion 81, and outputs the second internal command to MFP control portion 81 only after MFP control portion 81 has completed the processing of the first internal command. If there are two or more hardware resources of the type to be controlled by the first and second internal commands, arbitration portion 77 outputs the first internal command to MFP control portion 81, and outputs the second internal command to MFP control portion 81 while MFP control portion 81 is executing the processing of the first internal command. This can avoid the collision of controls on a hardware resource even in the case where a plurality of application programs are executed.

While MFP 100 has been described as an example of the image forming apparatus in the above embodiment, the present invention may of course be understood as an application control method for causing MFP 100 to perform the processing shown in FIGS. 10 and 11, or as an application control program for causing CPU 111 which controls MFP 100 to perform the application control method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus including a control portion to control hardware resources,
    said control portion comprising:
        an internal control portion operable, in response to an input of an internal command, to execute a process predetermined for said input internal command in order to control said hardware resources;
        an application executing portion to execute an application program; and
        an application control portion operable, in the case where said application executing portion outputs an application command which has been released for controlling said internal control portion, to convert the output application command into said internal command and to output said internal command to said internal control portion,
    said application executing portion including
        a first custom portion to execute a first application program, and
        a second custom portion to execute a second application program, said application control portion including
a controlled-object determination portion operable, in the case where a first application command is input from said first custom portion and a second application command is input from said second custom portion, to determine whether the hardware resources to be controlled by a first internal command obtained by converting said first application command and the hardware resources to be controlled by a second internal command obtained by converting said second application command are of a same type, and
an arbitration portion to control timings for outputting said first internal command and said second internal command to said internal control portion on the basis of a result of determination by said controlled-object determination portion.

2. The image forming apparatus according to claim 1, wherein
said application control portion further includes a resource information acquiring portion to acquire resource information on said hardware resources, and
said arbitration portion includes a hardware determination portion operable, in the case where said controlled-object determination portion determines that the hardware resources to be controlled by said first internal command and said second internal command are of the same type, to determine, on the basis of said acquired resource information, whether a number of hardware resources of the type to be controlled by said first internal command and said second internal command is one, and
in the case where the number of hardware resources of the type to be controlled by said first and second internal commands is one, said arbitration portion outputs one of said first internal command and said second internal command to said internal control portion, and outputs the other of said first internal command and said second internal command to said internal control portion after a processing by said internal control portion is completed, whereas in the case where the number of hardware resources of the type to be controlled by said first and second internal commands is two or more, said arbitration portion outputs one of said first internal command and said second internal command to said internal control portion, and outputs the other of said first internal command and said second internal command to said internal control portion while the processing by said internal control portion is in progress.

3. The image forming apparatus according to claim 2, wherein in the case where the first application command is input from said first custom portion before the second application command is input from said second custom portion, said arbitration portion outputs said first internal command to said internal control portion before outputting said second internal command to said internal control portion.

4. The image forming apparatus according to claim 2, wherein
said application control portion further includes a priority determining portion to determine priorities of said first custom portion and said second custom portion, and
in the case where a priority of said first custom portion is higher than a priority of said second custom portion, said arbitration portion outputs said first internal command to said internal control portion before outputting said second internal command to said internal control portion, whereas in the case where the priority of said first custom portion is lower than the priority of said second custom portion, said arbitration portion outputs said second internal command to said internal control portion before outputting said first internal command to said internal control portion.

5. An application control method performed by a computer controlling hardware resources included in an image forming apparatus,
said computer including
an internal control portion operable, in response to an input of an internal command, to execute a process predetermined for said input internal command in order to control said hardware resources, and
an application executing portion to execute an application program,
the method causing said computer to execute:
a conversion step of, in the case where said application executing portion outputs an application command which has been released for controlling said internal control portion, converting the output application command into said internal command; and
an application control step of outputting said internal command to said internal control portion,
said application executing portion including
a first custom portion to execute a first application program, and
a second custom portion to execute a second application program,
said application control step including
a controlled-object determination step of, in the case where a first application command is input from said first custom portion and a second application command is input from said second custom portion, determining whether the hardware resources to be controlled by a first internal command obtained by converting said first application command and the hardware resources to be controlled by a second internal command obtained by converting said second application command are of a same type, and
an arbitration step of controlling timings for outputting said first internal command and said second internal command to said internal control portion on the basis of a result of determination in said controlled-object determination step.

6. The application control method according to claim 5, wherein
said application control step further includes a resource information acquiring step of acquiring resource information on said hardware resources, and
said arbitration step includes
a hardware determination step of, in the case where it is determined in said controlled-object determination step that the hardware resources to be controlled by said first internal command and said second internal command are of the same type, determining, on the basis of said acquired resource information, whether a number of hardware resources of the type to be controlled by said first internal command and said second internal command is one,
a step of, in the case where the number of hardware resources of the type to be controlled by said first and second internal commands is one, outputting one of said first internal command and said second internal command to said internal control portion, and outputting the other of said first internal command and said second internal command to said internal control portion after a processing by said internal control portion is completed, and a step of, in the case where the number of hardware resources of the type to be controlled by said first and second internal commands is two or more, outputting one of said first internal command and said second internal command to said internal control portion, and outputting the other of said first internal command and said second internal command to said internal control portion while the processing by said internal control portion is in progress.

7. The application control method according to claim 6, wherein said arbitration step includes a step of, in the case where the first application command is input from said first custom portion before the second application command is input from said second custom portion, outputting said first internal command to said internal control portion before outputting said second internal command to said internal control portion.

8. The application control method according to claim 6, wherein
said application control step further includes a priority determining step of determining priorities of said first custom portion and said second custom portion, and
said arbitration step includes steps of,
in the case where a priority of said first custom portion is higher than a priority of said second custom portion, outputting said first internal command to said internal control portion before outputting said second internal command to said internal control portion, and
in the case where the priority of said first custom portion is lower than the priority of said second custom portion, outputting said second internal command to said internal control portion before outputting said first internal command to said internal control portion.

9. A non-transitory computer-readable recording medium encoded with an application control program performed by a computer controlling hardware resources included in an image forming apparatus,
said computer including
an internal control portion operable, in response to an input of an internal command, to execute a process predetermined for said input internal command in order to control said hardware resources, and
an application executing portion to execute an application program,
the application control program causing said computer to execute:
a conversion step of, in the case where said application executing portion outputs an application command which has been released for controlling said internal control portion, converting the output application command into said internal command; and
an application control step of outputting said internal command to said internal control portion,
said application executing portion including
a first custom portion to execute a first application program, and
a second custom portion to execute a second application program,
said application control step including
a controlled-object determination step of, in the case where a first application command is input from said first custom portion and a second application command is input from said second custom portion, determining whether the hardware resources to be controlled by a first internal command obtained by converting said first application command and the hardware resources to be controlled by a second internal command obtained by converting said second application command are of a same type, and
an arbitration step of controlling timings for outputting said first internal command and said second internal command to said internal control portion on the basis of a result of determination in said controlled-object determination step.

10. The application control program according to claim 9, wherein
said application control step further includes a resource information acquiring step of acquiring resource information on said hardware resources, and
said arbitration step includes
a hardware determination step of, in the case where it is determined in said controlled-object determination step that the hardware resources to be controlled by said first internal command and said second internal command are of the same type, determining, on the basis of said acquired resource information, whether a number of hardware resources of the type to be controlled by said first internal command and said second internal command is one,
a step of, in the case where the number of hardware resources of the type to be controlled by said first and second internal commands is one, outputting one of said first internal command and said second internal command to said internal control portion, and outputting the other of said first internal command and said second internal command to said internal control portion after a processing by said internal control portion is completed, and
a step of, in the case where the number of hardware resources of the type to be controlled by said first and second internal commands is two or more, outputting one of said first internal command and said second internal command to said internal control portion, and outputting the other of said first internal command and said second internal command to said internal control portion while the processing by said internal control portion is in progress.

11. The application control program according to claim 10, wherein said arbitration step includes a step of, in the case where the first application command is input from said first custom portion before the second application command is input from said second custom portion, outputting said first internal command to said internal control portion before outputting said second internal command to said internal control portion.

12. The application control program according to claim 10, wherein
said application control step further includes a priority determining step of determining priorities of said first custom portion and said second custom portion, and
said arbitration step includes steps of,
in the case where a priority of said first custom portion is higher than a priority of said second custom portion, outputting said first internal command to said internal control portion before outputting said second internal command to said internal control portion, and
in the case where the priority of said first custom portion is lower than the priority of said second custom portion, outputting said second internal command to said internal control portion before outputting said first internal command to said internal control portion.

* * * * *